(12) United States Patent
Horton et al.

(10) Patent No.: US 12,264,112 B2
(45) Date of Patent: *Apr. 1, 2025

(54) PELLETIZED BASALT FOR USE AS A SOIL AMENDMENT

(71) Applicant: Specialty Granules Investments LLC, Parsippany, NJ (US)

(72) Inventors: John Horton, Frederick, MD (US); Justin P. Dunlap, Hagerstown, MD (US)

(73) Assignee: Specialty Granules Investments LLC, Parsippany, NJ (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/314,208

(22) Filed: May 9, 2023

(65) Prior Publication Data

US 2023/0271891 A1 Aug. 31, 2023

Related U.S. Application Data

(63) Continuation of application No. 17/005,352, filed on Aug. 28, 2020, now Pat. No. 11,680,023, which is a continuation of application No. 16/829,258, filed on Mar. 25, 2020, now Pat. No. 10,766,827.

(60) Provisional application No. 62/884,334, filed on Aug. 8, 2019.

(51) Int. Cl.
C05D 9/00 (2006.01)

(52) U.S. Cl.
CPC ........................... *C05D 9/00* (2013.01)

(58) Field of Classification Search
CPC .. C05D 9/00; C05G 5/12; C09K 17/40; C05F 11/02
See application file for complete search history.

(56) References Cited

U.S. PATENT DOCUMENTS

| | | |
|---|---|---|
| 8,623,111 B2 | 1/2014 | Detweiler et al. |
| 10,766,827 B1 | 9/2020 | Horton et al. |
| 11,554,996 B2 | 1/2023 | Horton et al. |
| 11,680,023 B2 | 6/2023 | Horton |
| 2001/0029762 A1* | 10/2001 | Steele ...................... C01F 11/46 71/63 |
| 2004/0163435 A1* | 8/2004 | Takahashi ................ C05D 3/04 71/33 |
| 2005/0074580 A1 | 4/2005 | Gross |
| 2015/0203414 A1* | 7/2015 | Cook ...................... C05F 11/02 71/7 |
| 2018/0093921 A1* | 4/2018 | Ciuperca ............. C04B 20/1074 |
| 2018/0099907 A1 | 4/2018 | Ciuperca |
| 2018/0194684 A1 | 7/2018 | Panzarella |
| 2018/0318893 A1 | 11/2018 | Roberts et al. |
| 2018/0325105 A1 | 11/2018 | Vadakekuttu et al. |
| 2019/0010093 A1 | 1/2019 | Laskowska |
| 2019/0225556 A1 | 7/2019 | Babu et al. |
| 2019/0367412 A1 | 12/2019 | Decker |
| 2020/0115293 A1 | 4/2020 | Guinez |
| 2021/0178438 A1 | 6/2021 | Pham |

FOREIGN PATENT DOCUMENTS

| | | | | |
|---|---|---|---|---|
| CA | 2113183 A1 | | 11/1993 | |
| CA | 2914547 A1 | | 6/2016 | |
| CN | 103627401 A | * | 3/2014 | |
| CN | 104909702 A | | 9/2015 | |
| CN | 105777259 A | | 7/2016 | |
| EP | 0180739 A2 | | 5/1986 | |
| EP | 2258159 B1 | | 4/2018 | |
| JP | 2002101871 A | * | 4/2002 | ............ C12M 25/16 |
| KR | 100382832 B1 | * | 5/2003 | |
| SU | 633969 A | | 11/1978 | |
| WO | 2012/083335 A1 | | 6/2012 | |

OTHER PUBLICATIONS

Jul. 21, 2023 European Official Action in European Patent Appln. No. 20849241.3.
Gislason et al., "Carbon Storage in Basalt," Science, vol. 344, Apr. 25, 2014, pp. 373-374.
Apr. 16, 2021 Canadian Official Action in Canadian Patent Appln. No. 3109628.
Jun. 28, 2021 Canadian Official Action in Canadian Patent Appln. No. 3109628.
Sep. 3, 2020 International Search Report and Written Opinion in International Patent Appln. No. PCT/US2020/045504.
Dec. 16, 2021 Canadian Official Action in Canadian Patent Appln. No. 3109628.

* cited by examiner

*Primary Examiner* — Jennifer A Smith
(74) *Attorney, Agent, or Firm* — Venable LLP

(57) ABSTRACT

A composition including at least about 50 wt % basalt and no more than about 20 wt % binding agent, wherein the composition is in the form of a plurality of particles. The composition can find applications in agriculture, horticulture, and gardening, and can be used. e.g., as soil amendment.

20 Claims, No Drawings

PELLETIZED BASALT FOR USE AS A SOIL AMENDMENT

CROSS-REFERENCE TO RELATED APPLICATIONS

This application is a continuation of application Ser. No. 17/005,352 filed Aug. 28, 2020, which is a continuation of application Ser. No. 16/829,258 filed Mar. 25, 2020, U.S. Pat. No. 10,766,827 B2, which claims the benefit of U.S. Provisional Patent Appln. No. 62/884,334 filed Aug. 8, 2019.

FIELD OF THE INVENTION

The invention relates generally to pelletized basalt and its use in agricultural, horticultural, or gardening applications such as soil amendment.

BACKGROUND OF THE INVENTION

Soil is a complex medium that includes a mixture of organic matter, minerals, gases, liquids, and organisms that together support life. In agriculture, horticulture, or gardening, it is often desirable to use land that is not initially optimal for growing plants. To that end, soil amendment compositions and fertilizers have been developed for optimizing the soil for plant growth.

While both are important, soil amendment compositions are different from fertilizers. Unlike fertilizers, which have the primary goal of adding nutrients to soil, soil amendment compositions can modify the condition of the soil itself. Fertilizers impact plant growth directly, while soil amendment compositions affect growth indirectly and sometimes deliver nutrients as a bonus. The goals of soil amendment compositions include improving soil's physical properties, such as water retention, permeability, water infiltration, drainage, aeration and structure.

SUMMARY OF THE INVENTION

Embodiments described herein include compositions comprising pelletized basalt. The compositions of the present disclosure can be used in various agricultural, horticultural, or gardening applications including soil amendment. The compositions of the present disclosure can also be used in carbon sequestration. Aspects of the present disclosure relate to compositions including pelletized basalt and at least one binding agent.

One aspect of the present disclosure relates to a soil amendment composition including between about 76 wt % and about 98 wt % basalt, and between about 1 wt % and about 20 wt % binding agent, wherein the composition is in the form of a plurality of particles (referred herein as "basalt-binder particles") having a suitable size for soil amendment applications.

Another aspect of the present disclosure relates to a soil amendment composition including between about 50 wt % and about 98 wt % basalt, and between about 1 wt % and about 15 wt % binding agent, wherein the composition is in the form of a plurality of basalt-binder particles having a suitable size for soil amendment applications.

In some embodiments, the soil amendment composition includes between about 80 wt % and about 98 wt % basalt, between about 85 wt % and about 98 wt % basalt, or between about 90 wt % and about 98 wt % basalt.

In some embodiments, the soil amendment composition includes between about 1 wt % and about 15 wt % the binding agent, between about 1 wt % and about 10 wt % the binding agent, or between about 1 wt % and about 5 wt % the binding agent.

In some embodiments, the binding agent is an organic liquid. The organic liquid can be sticky and viscous.

In some embodiments, the binding agent is humic acid, lignosulfonate, or a combination thereof.

In some embodiments, the soil amendment composition includes an inorganic compound that includes nitrogen, phosphorus, and/or potassium. In some embodiments, the inorganic compound is suitable for soil amendment applications.

In some embodiments, the soil amendment composition includes between about 0.5 wt % and about 20 wt % the inorganic compound.

In some embodiments, the soil amendment composition includes lime.

In some embodiments, the soil amendment composition includes between about 0.5 wt % and about 20 wt % lime.

In some embodiments, the soil amendment composition is substantially free of a microbial component.

In some embodiments, the plurality of basalt-binder particles have an average particle size of about 0.25 mm to about 10 mm.

In some embodiments, the basalt is in the form of a plurality of particles (referred herein as "basalt particles"), with at least about 60% of the basalt particles passing 100 mesh and the balance passing 200 mesh.

In some embodiments, the plurality of basalt-binder particles is compatible with a standard agricultural distribution machine, e.g., a spin-broadcast fertilizer spreader or a seed planter.

Another aspect of the present disclosure relates to a process for producing the soil amendment composition of the present disclosure, comprising: mixing basalt and a binding agent in a pin mixer to produce a plurality of particles; heating the plurality of particles to remove moisture; and removing particles having a size outside a desirable size range.

In some embodiments, the process includes using a disk pelletizer to increase particle size. In some embodiments, the particle size can be increased prior to heating the plurality of particles.

In some embodiments, the plurality of particles are heated at between about 38° C. and about 150° C.

In yet another aspect, the invention relates to a method comprising obtaining a soil amendment composition by performing a process comprising (a) mixing basalt and a binding agent to produce a plurality of particles, (b) heating the plurality of particles to remove moisture, and (c) removing, from the plurality of particles after the heating, particles having a size outside a desired size range, to obtain a soil amendment composition, wherein, with wt % being measured with respect to a total mass of the soil amendment composition, the soil amendment composition comprises basalt in an amount between 76 wt % and 98 wt % and a binding agent in an amount between 1 wt % and 20 wt %, or the soil amendment composition comprises basalt in an amount between 50 wt % and 98 wt % and a binding agent in an amount between 1 wt % and 15 wt %.

In another aspect, the mixing uses a pin mixer, the method further comprises using a disk pelletizer, and the heating heats the plurality of particles at a temperature between 38° C. and 150° C.

In a yet further aspect, the soil amendment composition comprises basalt in an amount between 76 wt % and 98 wt % and a binding agent in an amount between 1 wt % and 20 wt %.

In another aspect, the soil amendment composition comprises basalt in an amount between 50 wt % and 98 wt % and a binding agent in an amount between 1 wt % and 15 wt %.

In a still further aspect, the soil amendment composition comprises basalt in an amount between 80 wt % and 98 wt %.

In another aspect, the soil amendment composition comprises basalt in an amount between 90 wt % and 98 wt %, the binding agent is humic acid, lignosulfonate, or a combination thereof, the soil amendment composition further comprises, in an amount between 0.5 wt % and 20 wt %, a compound that includes at least one of nitrogen, phosphorus, and potassium, the soil amendment composition is substantially free of a microbial component, the plurality of particles has have an average particle size of about 0.25 mm to about 10 mm, and the basalt is in the form of a plurality of basalt particles, with at least 60% of the basalt particles passing 100 mesh and the balance passing 200 mesh.

In a still further aspect, the invention relates to a soil amendment composition comprising, with wt % being measured with respect to a total mass of the soil amendment composition, (1) basalt in an amount between 76 wt % and 98 wt % and a binding agent in an amount between 1 wt % and 20 wt %, or (2) basalt in an amount between 50 wt % and 98 wt % and a binding agent in an amount between 1 wt % and 15 wt %.

In another aspect, the soil amendment composition comprises basalt in an amount between 90 wt % and 98 wt %, the binding agent comprises at least one of humic acid and lignosulfonate, the soil amendment composition further comprises, in an amount between 0.5 wt % and 20 wt %, a compound that includes at least one of nitrogen, phosphorus, and potassium, the soil amendment composition is substantially free of a microbial component, the plurality of particles have an average particle size of about 0.25 mm to 10 mm, and the basalt is in the form of a plurality of basalt particles, with at least 60% of the basalt particles passing 100 mesh and the balance passing 200 mesh.

Yet another aspect of the present disclosure relates to a method for improving soil quality, comprising contacting the soil with the soil amendment composition of the present disclosure. In some embodiments, the soil amendment composition is sprayed onto the soil, e.g., by an aircraft.

In a still further aspect, the invention relates to a soil amendment composition comprising (a) at least one of basalt, metabasalt, or a combination thereof, wherein the at least one of basalt, metabasalt, or a combination thereof is present at 50 wt % to 98 wt % based on a total weight of the soil amendment composition; and (b) a binding agent, wherein the binding agent is present at 1 wt % to 20 wt % based on the total weight of the soil amendment composition, and wherein the soil amendment composition is in the form of a plurality of particles. In another aspect, the soil amendment composition comprises basalt.

In another aspect, the soil amendment composition comprises metabasalt.

In another aspect, the binding agent is present at 1 wt % to 15 wt % based on the total weight of the soil amendment composition.

In another aspect, the binding agent is present at 1 wt % to 10 wt % based on the total weight of the soil amendment composition.

In another aspect, the binding agent is present at 1 wt % to 5 wt % based on the total weight of the soil amendment composition.

In another aspect, the at least one of basalt, metabasalt, or a combination thereof is present at 80 wt % to 98 wt % based on the total weight of the soil amendment composition.

In another aspect, the at least one of basalt, metabasalt, or a combination thereof is present at 90 wt % to 98 wt % based on the total weight of the soil amendment composition. In another aspect, the binding agent is an organic liquid.

In another aspect, the binding agent is humic acid, lignosulfonate, or a combination thereof.

In another aspect, the binding agent is humic acid.

In another aspect, the binding agent is a combination of humic acid and lignosulfonate, and a weight ratio of the humic acid and the lignosulfonate is 10:1 to 99:1.

In another aspect, the soil amendment composition further comprises an inorganic compound that includes at least one of nitrogen, phosphorus, potassium, or combinations thereof.

In another aspect, the inorganic compound is present at 0.5 wt % to 20 wt % based on the total weight of the soil amendment composition.

In another aspect, the soil amendment further comprises lime.

In another aspect, the soil amendment composition is substantially free of a microbial component.

In another aspect, the plurality of particles have an average particle size of about 0.25 mm to 10 mm.

In another aspect, the plurality of particles have an average particle size of about 1 mm to about 4 mm.

In another aspect, the plurality of particles have an average particle size of about 2 mm to about 3 mm.

In another aspect, at least 60% of the plurality of particles pass 100 US mesh.

In yet another aspect, the invention relates to a method comprising (a) mixing (i) at least one of basalt, metabasalt, or a combination thereof and (ii) a binding agent to produce a plurality of particles (a) heating the plurality of particles; and (c) removing particles having a size outside a desired size range from the plurality of particles, to obtain a soil amendment composition, wherein the at least one of basalt, metabasalt, or a combination thereof is present at 50 wt % to 98 wt % based on a total weight of the soil amendment composition, and wherein the binding agent is present at 1 wt % to 20 wt % based on the total weight of the soil amendment composition. In another aspect, the mixing uses a pin mixer.

In another aspect, the method further comprises pelletizing the soil amendment composition.

In another aspect, the pelletizing uses at least one of a disk pelletizer or a pan pelletizer In another aspect, the heating includes exposing the plurality of particles to a temperature of 38° C. to 150° C.

In another aspect, the soil amendment composition comprises basalt in an amount of 76 wt % to 98 wt % and the binding agent in an amount of 1 wt % to 20 wt %.

Among those benefits and improvements that have been disclosed, other objects and advantages of this invention will become apparent from the following description. Detailed embodiments of the invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described below, various embodiments of the invention may be readily combined, without departing from the scope or spirit of the invention.

DETAILED DESCRIPTION

Basalt is a dark-colored, fine-grained, igneous rock composed mainly of plagioclase and pyroxene minerals. Basalt is abundantly available on Earth, as more than 90% of all volcanic rock is basalt. As a result of its abundance, basalt is inexpensive in the market. Basalt generally includes $SiO_2$, total alkalis, $TiO_2$, FeO, CaO, and $Al_2O_3$. The composition of basalt can vary depending on the origin or type of the basalt. Unpelletized basalt has been used in soil amendment applications, and has been proven to improve root systems, increase yields and promote general plant health in a wide variety of crops and conditions. As compared to unpelletized basalt, pelletized basalt has the following advantages: (a) pelletized basalt can mix better with the soil; (b) pelletized basalt can be used as a carrier for other useful components for the soil, such as sulphur, lime, urea, nitrogen, and fertilizers; (c) pelletized basalt can be applied more uniformly and thus provide more uniform results; and (d) pelletized basalt can also have value as a pesticide.

The present disclosure is based, inter alia, on the discovery that particles having a suitable size for soil amendment applications can be formed at a high basalt concentration (about 50 wt % or more) and a low binding-agent concentration (about 20 wt % or less). In some embodiments, particles having a suitable size for soil amendment applications can be formed at a basalt concentration of about 76 wt % or more and a binding-agent concentration of about 20 wt % or less. More surprisingly, it was discovered that a binding-agent concentration of less than about 3 wt % was still sufficient to produce particles having a suitable size for soil amendment applications. Since basalt contains a variety of micronutrients beneficial for the soil, such benefits increase as the basalt concentration in a soil amendment composition increases.

Accordingly, aspects of the present disclosure relate to compositions including pelletized basalt and at least one binding agent. In one aspect, the present disclosure provides a soil amendment composition including between about 50 wt % and about 98 wt % basalt, and between about 1 wt % and about 20 wt % binding agent. The compositions can be in the form of a plurality of basalt-binder particles having a suitable size for soil amendment applications.

There are many types of basalt, including but not limited to, tholeiitic basalt, high-alumina basalt, alkali basalt, boninite, ocean island basalt, and lunar basalt. Compositions of the present disclosure are not limited to any specific type of basalt. In some embodiments, the composition can include at least about 50 wt % basalt, at least about 55 wt % basalt, at least about 60 wt % basalt, at least about 65 wt % basalt, at least about 70 wt % basalt, at least about 75 wt % basalt, at least about 76 wt % basalt, at least about 80 wt % basalt, at least about 85 wt % basalt, at least about 86 wt % basalt, at least about 87 wt % basalt, at least about 88 wt % basalt, at least about 89 wt % basalt, at least about 90 wt % basalt, at least about 91 wt % basalt, at least about 92 wt % basalt, at least about 93 wt % basalt, at least about 94 wt % basalt, at least about 95 wt % basalt, at least about 96 wt % basalt, or at least about 97 wt % basalt.

In some embodiments, the composition can include no more than about 98 wt % basalt, no more than about 97 wt % basalt, no more than about 96 wt % basalt, no more than about 95 wt % basalt, no more than about 94 wt % basalt, no more than about 93 wt % basalt, no more than about 92 wt % basalt, no more than about 91 wt % basalt, no more than about 90 wt % basalt, no more than about 85 wt % basalt, no more than about 80 wt % basalt, no more than about 75 wt % basalt, no more than about 70 wt % basalt, no more than about 65 wt % basalt, or no more than about 60 wt % basalt.

Combinations of the above-referenced ranges for the basalt concentration are also possible. For example, the composition can include between about 50 wt % and about 98 wt % basalt, between about 60 wt % and about 98 wt % basalt, between about 70 wt % and about 98 wt % basalt, between about 75 wt % and about 98 wt % basalt, between about 76 wt % and about 98 wt % basalt, between about 80 wt % and about 98 wt % basalt, between about 85 wt % and about 98 wt % basalt, between about 86 wt % and about 98 wt % basalt, between about 87 wt % and about 98 wt % basalt, between about 88 wt % and about 98 wt % basalt, between about 89 wt % and about 98 wt % basalt, or between about 90 wt % and about 98 wt % basalt.

The binding agent serves several functions. The primary function of the binding agent is to help the basalt particles agglomerate. A secondary function of the binding agent is to provide crops or plants with a source of carbon or carbohydrates.

In some embodiments, the composition can include at least about 1 wt % binding agent, at least about 2 wt % binding agent, at least about 3 wt % binding agent, at least about 4 wt % binding agent, at least about 5 wt % binding agent, at least about 6 wt % binding agent, at least about 7 wt % binding agent, at least about 8 wt % binding agent, at least about 9 wt % binding agent, at least about 10 wt % binding agent, at least about 11 wt % binding agent, at least about 12 wt % binding agent, at least about 13 wt % binding agent, at least about 14 wt % binding agent, at least about 15 wt % binding agent, at least about 16 wt % binding agent, at least about 17 wt % binding agent, or at least about 18 wt % binding agent.

In some embodiments, the composition can include no more than about 20 wt % binding agent, no more than about 18 wt % binding agent, no more than about 15 wt % binding agent, no more than about 14 wt % binding agent, no more than about 13 wt % binding agent, no more than about 12 wt % binding agent, no more than about 11 wt % binding agent, no more than about 10 wt % binding agent, no more than about 9 wt % binding agent, no more than about 8 wt % binding agent, no more than about 7 wt % binding agent, no more than about 6 wt % binding agent, no more than about 5 wt % binding agent, no more than about 4 wt % binding agent, or no more than about 3 wt % binding agent.

Combinations of the above-referenced ranges for the binding-agent concentration are also possible. For example, the composition can include between about 1 wt % and about 20 wt % binding agent, between about 1 wt % and about 15 wt % binding agent, between about 1 wt % and about 10 wt % binding agent, between about 1 wt % and about 9 wt % binding agent, between about 1 wt % and about 8 wt % binding agent, between about 1 wt % and about 7 wt % binding agent, between about 1 wt % and about 6 wt % binding agent, between about 1 wt % and about 5 wt % binding agent, between about 1 wt % and about 4 wt % binding agent, between about 1 wt % and about 3 wt % binding agent, between about 2 wt % and about 10 wt % binding agent, or between about 3 wt % and about 10 wt % binding agent. With the low binding-agent concentration (e.g., no more than about 20 wt %), the basalt can dissolve faster into soil, thereby releasing the micronutrients faster.

The binding agent can be a liquid, e.g., an organic liquid. The organic liquid can be sticky and viscous. In some embodiments, the binding agent can include humic acid (e.g., liquid humic acid). Humic acid is a complex mixture of many different acids containing carboxyl and phenolate groups so that the mixture behaves functionally as a dibasic acid or, occasionally, as a tribasic acid. Liquid humic acid can add to the functionality of the particles in the compositions of the present disclosure, as it can help to chelate the micronutrients which make them more accessible to the crops or plants.

In some embodiments, the binding agent can include lignosulfonate. Lignosulfonates or sulfonated lignin (CAS number 8062-15-5) are water-soluble anionic polyelectrolyte polymers.

They are byproducts from the production of wood pulp using sulfite pulping. Lignosulfonates have a broad range of molecular weight. A range of from 1000-140,000 Dalton has been reported for softwood lignosulfonates with lower values reported for hardwoods.

In some embodiments, the binding agent can include a combination of humic acid and lignosulfonate, which can have a weight ratio of between about 1:99 and about 99:1. For example, the humic acid and lignosulfonate can have a weight ratio of between about 1:99 and about 90:1, between about 1:99 and about 80:1, between about 1:99 and about 70:1, between about 1:99 and about 60:1, between about 1:99 and about 50:1, between about 1:99 and about 40:1, between about 1:99 and about 30:1, between about 1:99 and about 20:1, between about 1:99 and about 10:1, between about 10:1 and about 99:1, between about 20:1 and about 99:1, between about 30:1 and about 99:1, between about 40:1 and about 99:1, between about 50:1 and about 99:1, between about 60:1 and about 99:1, between about 70:1 and about 99:1, or between about 80:1 and about 99:1.

In some embodiments, the binding agent can include heavy organic liquids that are the waste products from breweries.

In some embodiments, the composition includes between about 76 wt % and about 98 wt % basalt, and between about 1 wt % and about 20 wt % binding agent, wherein the composition is in the form of a plurality of basalt-binder particles having a suitable size for soil amendment applications.

In some embodiments, the composition includes between about 50 wt % and about 98 wt % basalt, and between about 1 wt % and about 15 wt % binding agent, wherein the composition is in the form of a plurality of basalt-binder particles having a suitable size for soil amendment applications.

The composition can include additional components such as enhancers (e.g., sulphur, lime, or urea), macronutrients, and fertilizers. In some embodiments, the composition can include an inorganic compound that includes nitrogen, phosphorus, and/or potassium, wherein the inorganic compound is suitable for soil amendment applications. In some embodiments, the composition can include between about 0.5 wt % and about 20 wt % inorganic compound, between about 1 wt % and about 20 wt % inorganic compound, between about 5 wt % and about 20 wt % inorganic compound, between about 10 wt % and about 20 wt % inorganic compound, between about 1 wt % and about 15 wt % inorganic compound, or between about 1 wt % and about 10 wt % inorganic compound.

In some embodiments, the composition can include lime, e.g., between about 0.5 wt % and about 20 wt % lime, between about 1 wt % and about 20 wt % lime, between about 5 wt % and about 20 wt % lime, between about 10 wt % and about 20 wt % lime, between about 1 wt % and about 15 wt % lime, or between about 1 wt % and about 10 wt % lime.

The composition can further include fulvic acid and/or bio-char products.

In some embodiments, the composition is substantially free of a microbial component. As used herein, "substantially free of a microbial component" in a composition refers to less than about 1 wt % of a microbial component based on the total weight of the composition.

Each basalt-binder particle can have the shape of a sphere, a cube, a rectangular prism, a cylinder, a cone, or a cuboid. In some embodiments, the basalt-binder particles are spherical. Each basalt-binder particle can be characterized by having a largest dimension. In some embodiments, the largest dimension is at least about 0.25 mm, at least about 0.5 mm, at least about 1 mm, at least about 2 mm, at least about 3 mm, at least about 4 mm, at least about 5 mm, at least about 6 mm, at least about 7 mm, at least about 8 mm, or at least about 9 mm. In some embodiments, the largest dimension is no more than about 10 mm, no more than about 9 mm, no more than about 8 mm, no more than about 7 mm, no more than about 6 mm, no more than about 5 mm, no more than about 4 mm, no more than about 3 mm, no more than about 2 mm, or no more than about 1 mm.

Combinations of the above-referenced ranges for the largest dimension are also possible. For example, the largest dimension is between about 0.25 mm and about 10 mm, between about 0.5 mm and about 10 mm, between about 1 mm and about 10 mm, between about 2 mm and about 10 mm, between about 3 mm and about 10 mm, between about 4 mm and about 10 mm, between about 5 mm and about 10 mm, between about 1 mm and about 8 mm, between about 1 mm and about 7 mm, between about 1 mm and about 6 mm, or between about 1 mm and about 5 mm.

In one embodiment, the above-referenced range for the largest dimension is about 1 mm to about 4 mm. In another embodiment, that range is about 2 mm to about 3 mm. In another embodiment, that range is about 1.5 mm to about 3.5 mm. In another embodiment, that range is about 2 mm to about 8 mm. In another embodiment, that range is about 3 mm to about 7 mm. In another embodiment, that range is about 4 mm to about 6 mm.

In some embodiments, the average particle size of the basalt-binder particles is at least about 0.25 mm, at least about 0.5 mm, at least about 1 mm, at least about 2 mm, at least about 3 mm, at least about 4 mm, at least about 5 mm, at least about 6 mm, at least about 7 mm, at least about 8 mm, or at least about 9 mm. In some embodiments, the average particle size of the basalt-binder particles is no more than about 10 mm, no more than about 9 mm, no more than about 8 mm, no more than about 7 mm, no more than about 6 mm, no more than about 5 mm, no more than about 4 mm, no more than about 3 mm, no more than about 2 mm, or no more than about 1 mm.

Combinations of the above-referenced ranges for the average particle size of the basalt-binder particles are also possible. For example, the average particle size of the basalt-binder particles is between about 0.25 mm and about 10 mm, between about 0.5 mm and about 10 mm, between about 1 mm and about 10 mm, between about 2 mm and about 10 mm, between about 3 mm and about 10 mm, between about 4 mm and about 10 mm, between about 5 mm and about 10 mm, between about 1 mm and about 8 mm, between about 1 mm and about 7 mm, between about 1 mm and about 6 mm, or between about 1 mm and about 5 mm.

In one embodiment, the above-referenced range for the average particle size of the basalt-binder particles is about 1 mm to about 4 mm. In another embodiment, that range is about 2 mm to about 3 mm. In another embodiment, that range is about 1.5 mm to about 3.5 mm. In another embodiment, that range is about 2 mm to about 8 mm. In another embodiment, that range is about 3 mm to about 7 mm. In another embodiment, that range is about 4 mm to about 6 mm.

In some embodiments, the plurality of basalt-binder particles can be substantially uniform in size. In some embodiments, the plurality of basalt-binder particles are substantially uniform in size when the largest dimensions of all the basalt-binder particles do not vary by more than 10%.

In some embodiments, a process for manufacturing a composition of the present disclosure can include: mixing basalt and a binding agent in a pin mixer to produce a plurality of particles; heating the plurality of particles to remove moisture; and removing particles having a size outside a desirable size range. If larger particles are desired, the smaller particles can be introduced to a disk pelletizer to increase the particle size. Any particles that are outside the desirable size range can be crushed and used as recycled material.

In some embodiments, basalt rock dust that has a plurality of basalt particles can be used as a starting material to mix with the binding agent. In some embodiments, the basalt used for manufacturing of the compositions can be in the form of a plurality of basalt particles, with at least about 60% of the basalt particles passing 100 mesh and the balance passing 200 mesh. Alternatively, when basalt is provided in the form of rocks, the process can further include a step of crushing the rocks to produce a plurality of basalt particles, prior to mixing with the binding agent.

In some embodiments, basalt and the binding agent can be mixed in a mixer at a weight ratio of about 98:1, about 95:1, about 90:1, about 85:1, about 80:1, about 75:1, about 70:1, about 65:1, about 60:1, about 55:1, about 50:1, about 45:1, about 40:1, about 35:1, about 30:1, about 25:1, about 20:1, about 15:1, about 10:1, about 9:1, about 8:1, about 7:1, about 6:1, about 5:1, or about 4:1. In some embodiments, the mixer can be a pin mixer. To produce a composition with X wt % binding agent, generally more than X wt % binding agent should be introduced into the mixer, as some portion of the binding agent may evaporate during the heating process. For example, to produce a composition with 20 wt % humic acid, basalt and humic acid should be mixed at a weight ratio of less than 80:20.

In some embodiments, the plurality of particles can be heated to remove moisture and keep the basalt-binder particles from breaking apart. In some embodiments, the heating can be done after the basalt-binder particles are formed. In some embodiments, the plurality of particles are heated at between about 38° C. and about 150° C., e.g., between about 40° C. and about 150° C., between about 50° C. and about 150° C., between about 60° C. and about 150° C., between about 70° C. and about 150° C., between about 80° C. and about 150° C., between about 90° C. and about 150° C., between about 100° C. and about 150° C., between about 40° C. and about 120° C., or between about 40° C. and about 100° C. For the compositions that are substantially free of a microbial component, higher temperatures in the heating step can be used.

In some embodiments, equipment that can be used in the manufacturing process includes, but is not limited to, a dry mixing bin, a liquid binder storage tank, a pin mixer, a disk pelletizer, a dryer (rotary or fluidized bed), a screener, a crusher, and bagging equipment.

The compositions of the present disclosure can be used in agriculture, horticulture, and gardening. The compositions can be used to condition the soil and/or improve soil quality. The compositions can be applied effectively by using standard agricultural equipment, e.g., a manual or powered spin-broadcast fertilizer spreader, a seed, or a hydroseeder. The compositions can be applied in one or more plant growing seasons.

The fine particle size of the basalt-binder particles allows for spray application. In some embodiments, the soil amendment composition can be suspended in a liquid and then sprayed onto the soil. For example, the liquid with the suspended basalt-binder particles can be sprayed onto the soil through a motor vehicle or an aircraft.

Prior to applying the compositions of the present disclosure, the soil can be tested to determine what it needs in terms of pH, macro and micronutrients as to produce healthy plants and/or optimizing crop yield. Based on the test results, a composition with the appropriate basalt/binding agent ratio can then be applied to the soil.

The compositions of the present disclosure can also be used for carbon sequestration. Sequestered carbon produced from fuel production can be employed to increase soil productivity in order to counteract the burning of the fuel. For carbon sequestration, $CO_2$ can be injected into reactive basaltic rocks. See Gislason and Oelkers, "Carbon Storage in Basalt," Science 2014, 344, 373-374, the contents of which are incorporated by reference. After the injection, solid carbonate minerals are formed, which can then be crushed and used as a starting material for producing the compositions of the present disclosure.

The compositions of the present disclosure can: (a) mitigate pH swings in soil, (b) reverse soil acidity, (c) correct for micronutrient and macronutrient deficiencies, (d) restore soil's native mineral and organic matter. (e) increase water holding capacity, (f) reduce soil compaction, (g) improve nutrient supply, (h) restore soil's natural bio-geo-chemical processes in highly/severely degraded soil, (i) support healthy biological life, (j) increase resistance against drought, pests, and pathogens, and/or (k) unlock calcium, magnesium, iron, manganese, zinc, copper, cobalt, nickel, and/or molybdenum for bio-availability to plants.

EXAMPLES

Example 1

In one example, three primary pieces of equipment (pin mixer, disc pelletizer, and fluid bed dryer) are used to produce the agglomerated material. A pin mixer is used to combine undersized basalt particles, with a liquid or dry binder mixture and any supplemental nutrients by using intense spinning motion to produce small, dense agglomerates. This is accomplished by metal pins (or rods) attached to a horizontal spinning shaft "mixing" the components together to produce small homogenous spherical pellets. For some materials, such as turf or ornamental uses, this material is discharged directly to a drying process. Other product specifications require larger particles to be produced, this is accomplished through the use of a disc or pan pelletizer. A disc pelletizer receives the material from the pin mixer and it begins "tumble growth" with additional liquid binder and centrifugal force to increase the size of the particles. The size is controlled by disc rotation speed, disc angle, feed material, and liquid additions. Once the desired size is reached, the material discharges to be dried in a fluid bed drying system. This type of dryer uses hot air from below a perforated plate to both move the material through the dryer as well as to reduce the moisture to the desired specification. There are multiple heating zones throughout the fluid bed unit as well as a cooling zone to prepare the material for downstream equipment handling.

A list of non-limiting embodiments of the present disclosure is shown below.

Embodiment 1 is a soil amendment composition comprising between 76 wt % and 98 wt % basalt, and between 1 wt % and 20 wt % a binding agent, wherein the composition is in the form of a plurality of particles having a suitable size for soil amendment applications.

Embodiment 2 is a soil amendment composition comprising between 50 wt % and 98 wt % basalt, and between 1 wt % and 15 wt % a binding agent, wherein the composition is in the form of a plurality of particles having a suitable size for soil amendment applications.

Embodiment 3 is a soil amendment composition of embodiment 1 or 2, comprising between 80 wt % and 98 wt % basalt.

Embodiment 4 is a soil amendment composition of any preceding embodiment, comprising between 85 wt % and 98 wt % basalt.

Embodiment 5 is a soil amendment composition of any preceding embodiment, comprising between 90 wt % and 98 wt % basalt.

Embodiment 6 is a soil amendment composition of any one of embodiments 1 and 3-5, comprising between 1 wt % and 15 wt % the binding agent.

Embodiment 7 is a soil amendment composition of any preceding embodiment, comprising between 1 wt % and 10 wt % the binding agent.

Embodiment 8 is a soil amendment composition of any preceding embodiment, comprising between 1 wt % and 5 wt % the binding agent.

Embodiment 9 is a soil amendment composition of any preceding embodiment, wherein the binding agent is an organic liquid.

Embodiment 10 is a soil amendment composition of embodiment 9, wherein the organic liquid is sticky and viscous.

Embodiment 11 is a soil amendment composition of embodiment 9, wherein the binding agent is humic acid, lignosulfonate, or a combination thereof.

Embodiment 12 is a soil amendment composition of any preceding embodiment, further comprising an inorganic compound that includes nitrogen, phosphorus, and/or potassium, wherein the inorganic compound is suitable for soil amendment applications.

Embodiment 13 is a soil amendment composition of embodiment 12, comprising between 0.5 wt % and 20 wt % the inorganic compound.

Embodiment 14 is a soil amendment composition of any preceding embodiment, further comprising lime.

Embodiment 15 is a soil amendment composition of embodiment 14, comprising 0.5 wt % and 20 wt % lime.

Embodiment 16 is a soil amendment composition of any preceding embodiment, substantially free of a microbial component.

Embodiment 17 is a soil amendment composition of any preceding embodiment, wherein the plurality of particles has a largest dimension between 0.25 mm and 10 mm.

Embodiment 18 is a soil amendment composition of any preceding embodiment, wherein the basalt is in the form of a plurality of basalt particles, with at least 60% of the basalt particles passing 100 mesh and the balance passing 200 mesh.

Embodiment 19 is a soil amendment composition of any preceding embodiment, wherein the plurality of particles is compatible with a standard agricultural distribution machine.

Embodiment 20 is a soil amendment composition of embodiment 19, wherein the standard agricultural distribution machine is a spin-broadcast fertilizer spreader or a seed planter.

Embodiment 21 is a process for producing the soil amendment composition of any one of embodiments 1-20, comprising mixing basalt and a binding agent in a pin mixer to produce a plurality of particles; heating the plurality of particles to remove moisture; and removing particles having a size outside a desirable size range.

Embodiment 22 is a process of embodiment 21, further comprising, prior to step (b), using a disk pelletizer to increase particle size.

Embodiment 23 is a process of embodiment 21 or 22, wherein step (b) comprises heating the plurality of particles at between 38° C. and 150° C.

Embodiment 24 is a method for improving soil quality, comprising contacting the soil with the soil amendment composition of any one of embodiments 1-20.

Embodiment 25 is a method of embodiment 24, wherein the soil amendment composition is sprayed onto the soil.

Embodiment 26 is a method of embodiment 25, wherein the soil amendment composition is sprayed onto the soil by an aircraft.

Embodiment 27 is a composition comprising a mixture of (a) a water-soluble anionic polyelectrolyte polymer, (b) an acid having a carboxyl group, (c) an acid having a phenolate group, (d) pelletized igneous rock in an amount of 50 wt % to 98 wt % based on the total weight of the composition, (e) lime, and (f) nitrogen-containing fertilizer.

Embodiment 28 is a liquid suspension of the composition of embodiment 27.

While the foregoing embodiments have been described as using basalt, the invention is not limited to basalt. For example, metabasalt, which is an amphibolite produced from the metamorphism of the basalt parent, may be used in addition to or instead of basalt. In other words, where the embodiments herein use the term basalt, they should be read as describing the use of basalt, metabasalt, or a combination of basalt and metabasalt. The wt % amount of basalt described above should be read as wt % amount of metabasalt in the case where metabasalt is used instead of basalt, and should be read as wt % amount of basalt and metabasalt combined in the case where metabasalt is used in addition to basalt.

Furthermore, in some embodiments, the soil amendment composition is substantially free of basalt, and in some embodiments, the soil amendment composition is substantially free of metabasalt. The expression "substantially free"

refers to less than 3 wt % with respect to the total weight of the soil amendment composition.

CONCLUSION

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Put another way, throughout the specification, the meaning of "a," "an," and "the" include plural references. Any ranges cited herein are inclusive.

The meaning of "in" includes "in" and "on."

The terms "substantially", "approximately," and "about" used throughout this Specification and the claims generally mean plus or minus 10% of the value stated, e.g., about 100 would include 90 to 110. Thus, as used herein, the term "about X" means X plus or minus 10%. For example, "about 10 wt %" means 9 wt % to 11 wt %.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. Put another way as used herein, the term "or" is an inclusive "or" operator, and is equivalent to the term "and/or," unless the context clearly dictates otherwise. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The term "based on" is not exclusive and allows for being based on additional factors not described, unless the context clearly dictates otherwise.

As used herein, "wt %" refers to weight percent.

As used herein, the term "binding agent" or "binder" refers to a compound that can bind a plurality of basalt particles together. The binding agent can either be liquid or solid.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

As used herein, "between" when referring to a range shall include both mentioned endpoints (for example, "between 1 wt % and 15 wt %" shall include both 1 wt % and 15 wt %), unless otherwise specified.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A soil amendment composition comprising:
at least one of basalt, metabasalt, or a combination thereof, wherein the at least one of basalt, metabasalt, or a combination thereof is present at 60 wt % to 98 wt % based on a total weight of the soil amendment composition; and
a binding agent,
wherein the soil amendment composition is in the form of a plurality of particles,
wherein the plurality of particles comprises a plurality of agglomerated particles having an average particle size of about 0.25 mm to about 10 mm, each of the plurality of agglomerated particles being a particle in which a plurality of particles of the at least one of basalt, metabasalt, or a combination thereof are agglomerated together by the binding agent, and
wherein the binding agent comprises humic acid.

2. The soil amendment composition of claim 1, wherein the soil amendment composition comprises basalt.

3. The soil amendment composition of claim 1, wherein the soil amendment composition comprises metabasalt.

4. The soil amendment composition of claim 1, wherein the binding agent is present at 1 wt % to 10 wt % based on the total weight of the soil amendment composition.

5. The soil amendment composition of claim 1, wherein the binding agent is present at 1 wt % to 5 wt % based on the total weight of the soil amendment composition.

6. The soil amendment composition of claim 1, wherein the at least one of basalt, metabasalt, or a combination thereof is present at 90 wt % to 98 wt % based on the total weight of the soil amendment composition.

7. The soil amendment composition of claim 1, wherein the binding agent is an organic liquid.

8. The soil amendment composition of claim 1, wherein the binding agent further comprises lignosulfonate.

9. The soil amendment composition of claim 8, wherein a weight ratio of the humic acid and the lignosulfonate is 10:1 to 99:1.

10. The soil amendment composition of claim 1, further comprising an inorganic compound that includes at least one of nitrogen, phosphorus, potassium, or combinations thereof.

11. The soil amendment composition of claim 10, wherein the inorganic compound is present at 0.5 wt % to 20 wt % based on the total weight of the soil amendment composition.

12. The soil amendment composition of claim 1, further comprising lime.

13. The soil amendment composition of claim 1, wherein the soil amendment composition is substantially free of a microbial component.

14. The soil amendment composition of claim 1, where the plurality of particles have an average particle size of about 1 mm to about 4 mm.

15. The soil amendment composition of claim 1, wherein at least 60% of the plurality of particles pass 100 US mesh.

16. The soil amendment composition of claim 1, wherein the at least one of basalt, metabasalt, or a combination thereof is selected from the group consisting of (a) tholeiitic basalt, (b) high-alumina basalt, (c) alkali basalt, (d) boninite, (e) ocean island basalt, and (f) lunar basalt.

17. A soil amendment composition comprising:
metabasalt, wherein the metabasalt is present at 60 wt % to 98 wt % based on a total weight of the soil amendment composition; and
a binding agent, wherein the soil amendment composition is in the form of a plurality of particles,
wherein the plurality of particles comprises a plurality of agglomerated particles having an average particle size of about 0.25 mm to about 10 mm, each of the plurality of agglomerated particles being a particle in which a plurality of particles of the metabasalt are agglomerated together by the binding agent, and
wherein the binding agent comprises humic acid.

18. The soil amendment composition of claim 17, wherein the binding agent is present at 1 wt % to 10 wt % based on the total weight of the soil amendment composition.

19. The soil amendment composition of claim 17, wherein the binding agent is present at 1 wt % to 5 wt % based on the total weight of the soil amendment composition.

20. A soil amendment composition comprising: metabasalt, wherein the metabasalt is present at 60 wt % to 98 wt % based on a total weight of the soil amendment composition; and
fulvic acid,
wherein the soil amendment composition is in the form of a plurality of particles, and
wherein the plurality of particles comprises a plurality of agglomerated particles having an average particle size of about 0.25 mm to about 10 mm, each of the plurality of agglomerated particles being a particle in which a plurality of particles of the metabasalt are agglomerated together.

* * * * *